United States Patent [19]
Recht et al.

[11] Patent Number: 5,485,506
[45] Date of Patent: Jan. 16, 1996

[54] METHOD FOR DESIGNATING RECORDED MESSAGES

[75] Inventors: Thomas S. Recht, Highland Park; James F. Goedken, Arlington Heights; Michael H. Pittelkow, Grayslake, all of Ill.

[73] Assignee: Motorola, Inc., Schaumburg, Ill.

[21] Appl. No.: 177,667

[22] Filed: Jan. 5, 1994

[51] Int. Cl.⁶ .................................................. H04M 1/64
[52] U.S. Cl. .............................. 379/67; 379/88; 379/89; 379/70
[58] Field of Search ....................... 379/88, 89, 67, 379/70, 77, 76, 69, 68, 110, 265, 266

[56] References Cited

U.S. PATENT DOCUMENTS

| | | | |
|---|---|---|---|
| 4,596,901 | 6/1986 | Hanscom et al. | 379/76 |
| 4,612,416 | 9/1986 | Emerson et al. | 379/89 |
| 4,617,425 | 10/1986 | Nakamura et al. | 379/77 |
| 4,646,346 | 2/1987 | Emerson et al. | 379/89 |
| 4,719,647 | 1/1988 | Theis et al. | 379/70 |
| 4,782,510 | 11/1988 | Szlam | 379/88 |
| 4,821,311 | 4/1989 | Hashimoto | 379/88 |
| 4,963,866 | 10/1990 | Duncan | 341/110 |
| 5,163,082 | 11/1992 | Karnowski | 379/88 |
| 5,283,818 | 2/1994 | Klausner et al. | 379/67 |

*Primary Examiner*—Jeffery A. Hofsass
*Assistant Examiner*—Scott Wolinsky
*Attorney, Agent, or Firm*—John J. King

[57] ABSTRACT

A method for designating messages allows individual messages to be designated as "read" if (i) the message has been played for a predetermined amount of time (150) or (ii) the replay of the message is completed (154). After a playback session, messages designated as "read" can be designated as "old" (102). Because of the queuing capability of the digital answering machine (142), stored messages can be replayed in any order, or a portion of a message can be conveniently replayed to determine whether the message should be replayed in full. As a result, new messages (i.e., messages which have not been designated as "read") can be located anywhere in the sequence of recorded messages. Such a function of the present invention allows a user to preview messages to selectively listen to messages, while maintaining a designation as "new" for any message in the sequence which has not been replayed in full or at least for a predetermined period of time. A user has the option of playing back all messages (92), or only those messages designated as "new" (98).

19 Claims, 6 Drawing Sheets

15,485,506

METHOD FOR DESIGNATING RECORDED MESSAGES

FIELD OF THE INVENTION

The present invention is generally related to answering machines, and more particularly to a method for designating messages recorded by an answering machine.

BACKGROUND OF THE INVENTION

Some conventional answering machines have provided a feature for distinguishing old messages from new messages. In particular, a user can save messages after listening to them during a playback session, and still determine whether additional messages have been recorded after the playback session. That is, the messages stored at some time after the playback session will be designated as "new". Therefore, a user can select to playback only new messages sequentially stored after the previous playback session. However, the designation of messages as being "new" is presently limited to messages received at a time after a playback session has been initiated.

Further, answering machines have generally provided queuing functions for selectively listening to designated messages. While such queuing is practically limited in analog (audio tape based) systems (i.e., the analog machine must "listen" to each message in order to find a designated message in a sequence), the queuing function provides access to a message at any position in the sequence of messages stored in an answering machine. However, no answering machine presently provides a way of stopping playback after listening to fewer than all messages and leaving messages which have not been replayed during the playback session designated as "new". Further, no answering machine presently allows a user to replay a selected portion of a message and still designate that message as "new" depending on the amount of the message replayed. Conventional answering machines will typically designate a message as old even if the message has not been replayed or only a short portion has been replayed.

Accordingly, there is a need to designate messages as being "new" at any position in a sequence of messages. That is, there is a need to provide a designation for a message based upon the period of time elapsed during the playback of a particular message, rather than the time at which the message was recorded, to more accurately reflect whether a message is "new".

BRIEF DESCRIPTION OF THE DRAWINGS

In describing the present invention, reference is made to the accompanying drawings wherein.

DESCRIPTION OF THE PREFERRED EMBODIMENT

The present invention provides a convenient method for providing a "designation" or "status indicator" for messages recorded by an answering machine. The present invention could find application in a digital answering machine, but could also be used in conventional analog answering machines. Initially, incoming messages are recorded and assigned a message number. Incoming messages are also designated as "new" as they are recorded. During the playback of the messages, individual messages can be designated as "read" if certain conditions are met. For example, a message could be marked as "read" if (i) the message has been played for a predetermined amount of time or (ii) the replay of the message is completed. At the end of a playback session, messages designated as "read" can be designated as "old".

Because of the queuing capability of a digital answering machine, stored messages can be conveniently replayed in any order. Further, a portion of a given message can be replayed to determine whether the message should be replayed in full. As a result, "new" messages (i.e., messages which have not been designated as "read" according to a certain criteria) can be located anywhere in the sequence of recorded messages, and are not restricted to one or more messages sequentially recorded after a playback session and stored at the end of a sequence of messages. The method of the present invention allows a user to preview messages to selectively listen to messages, while maintaining a designation as "new" for any message in the sequence which has not been replayed in full or for a predetermined period of time. Finally, during playback, a user can select a category of messages based upon a message designation, such as "new" messages or "all" messages, to be replayed.

Figure 1:
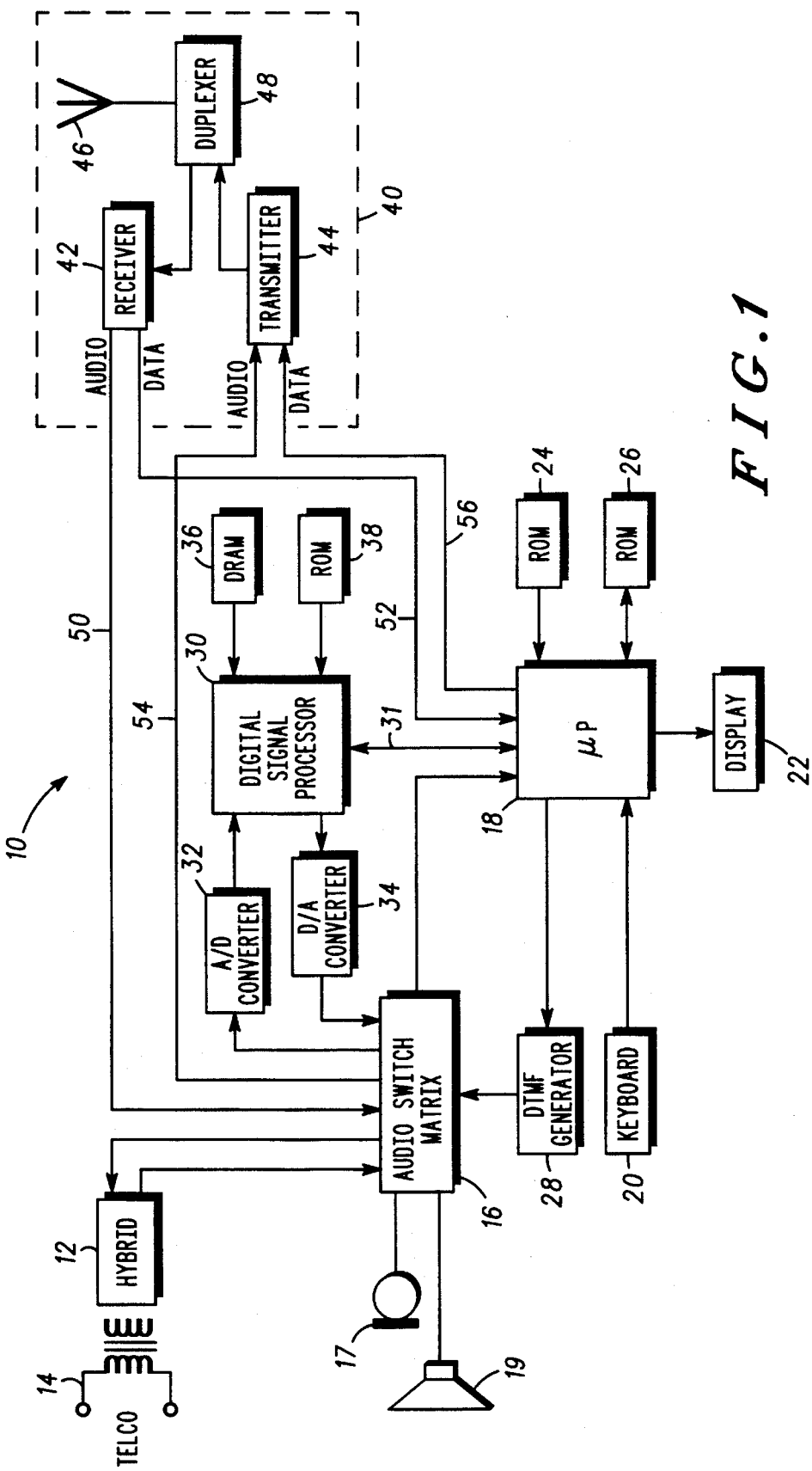
FIG. 1 is a block diagram of a circuit for a cordless digital answering machine.

Turning to FIG. 1, a block diagram of a circuit of a digital answering machine for employing the method for designating recorded messages is shown. Circuit 10 includes a hybrid circuit 12 coupled to the telco line 14. The hybrid circuit generally communicates with an audio switch matrix 16. Audio switch matrix 16 receives signals from a microphone 17 and provides signals to a microprocessor 18 which generally controls the operation of circuit 10. Audio switch matrix 16 also transmits signals to a speaker 19.

A keyboard 20 is also coupled to microprocessor 18. As will be described in detail in reference to FIG. 2, keyboard 20 should include function keys for queuing capability. Circuit 10 also includes a display 22 coupled to microprocessor 18 to display the total number of messages (or "new" messages) recorded, or the present message (or "new" message) being replayed. A read only memory (ROM) 24 and an electrically erasable programmable read only memory (EEPROM) 26 are coupled to microprocessor 18 for storing memory recall data and data required for performing other conventional telephone functions. A dual tone multi-frequency (DTMF) generator 28 also receives signals from microprocessor 18 to generate DTMF signals on the telco line by way of audio switch matrix 16. Finally, a digital signal processor 30 is coupled by a bus 31 to communicate with microprocessor 18. Digital signal processor 30 generally receives and transmits signals by way of an analog to digital converter 32 and a digital to analog converter 34 which are coupled to audio switch matrix 16. A dynamic random access memory (DRAM) 36 and a ROM 38 are associated with digital signal processor 30 for storing message information.

In a cordless telephone incorporating the method of the present invention, a transceiver 40 for communication with a cordless handset is provided. Transceiver 40 generally includes a receiver 42 and a transmitter 44 which are coupled to an antenna 46 by way of a duplexer 48. Generally, receiver 42 provides audio signals to audio switch matrix 16 by way of audio line 50 and data signals to microprocessor 18 by way of data line 52. Also, transmitter 44 receives audio signals from audio switch matrix 16 by way audio line 54 and data signals from microprocessor 18 by way data line 56. The block diagram of the circuit described in reference to FIG. 1 is one example of a circuit which could employ the method of the present invention. However, it will be understood that other circuits or recording devices could incorporate the method of the present invention.

Figure 2:
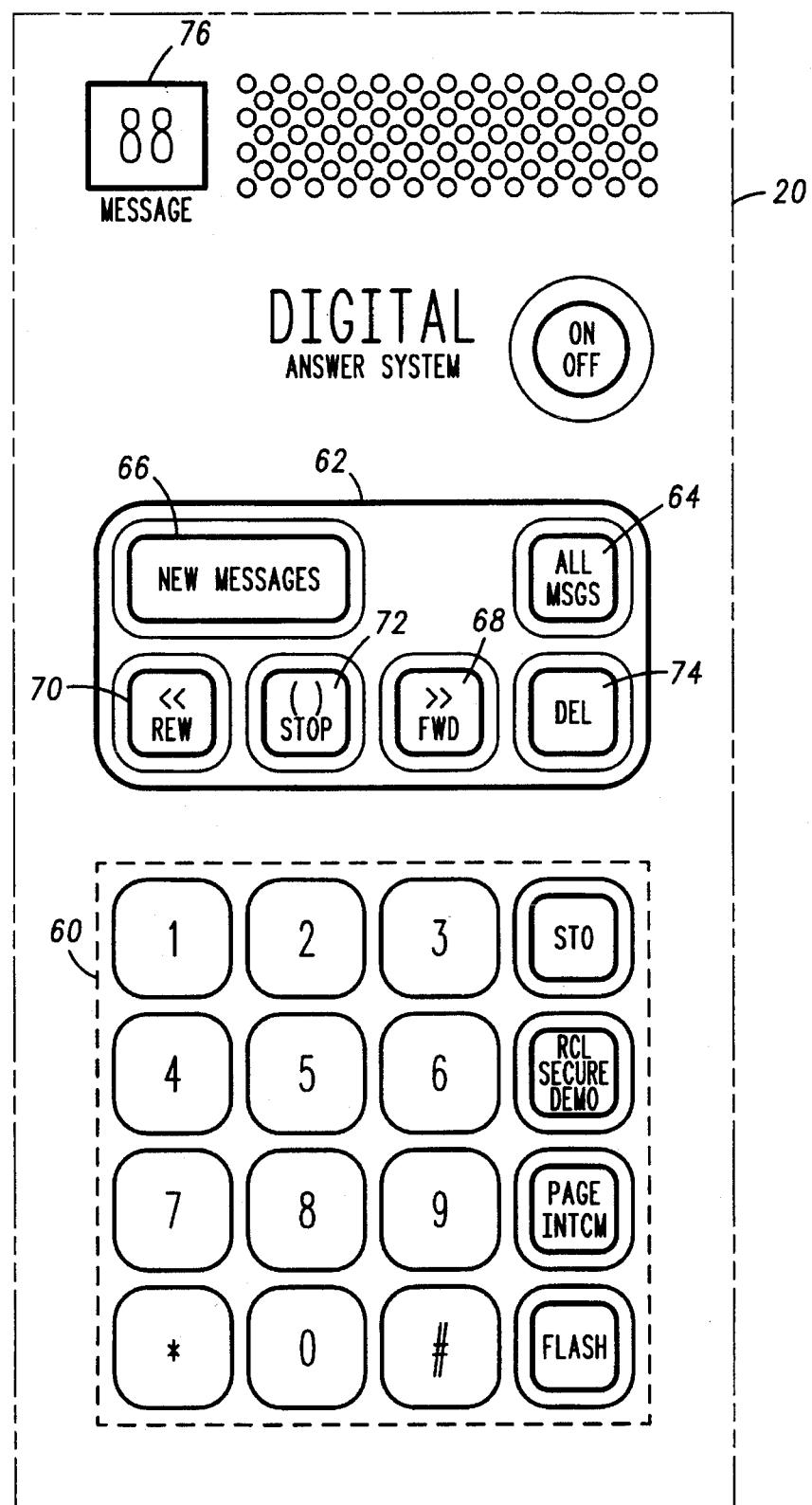
FIG. 2 is a plan view of keyboard 20 shown in FIG. 1.

Turning now to FIG. 2, the preferred keyboard 20 for a device implementing the present invention is shown. The keyboard generally includes a key panel 60 including standard number keys for dialing and other function keys commonly incorporated in telephones. The keyboard also preferably includes a control panel 62 having a replay key 64 for selecting all recorded messages to be replayed and a replay key 66 for selecting only messages designated as "new" to be replayed. Additionally, control panel 60 includes a forward key (FWD) 68, a rewind key (REW) 70 and a stop key 72. A delete key (DEL) 74 is included to selectively delete recorded messages. Finally, a display 76 is provided to indicate the message being replayed or the total number of messages recorded. As will be described in detail infra, the number displayed may correspond to one of all recorded messages, or one of the newly recorded messages, depending upon the function selected.

Figure 3:
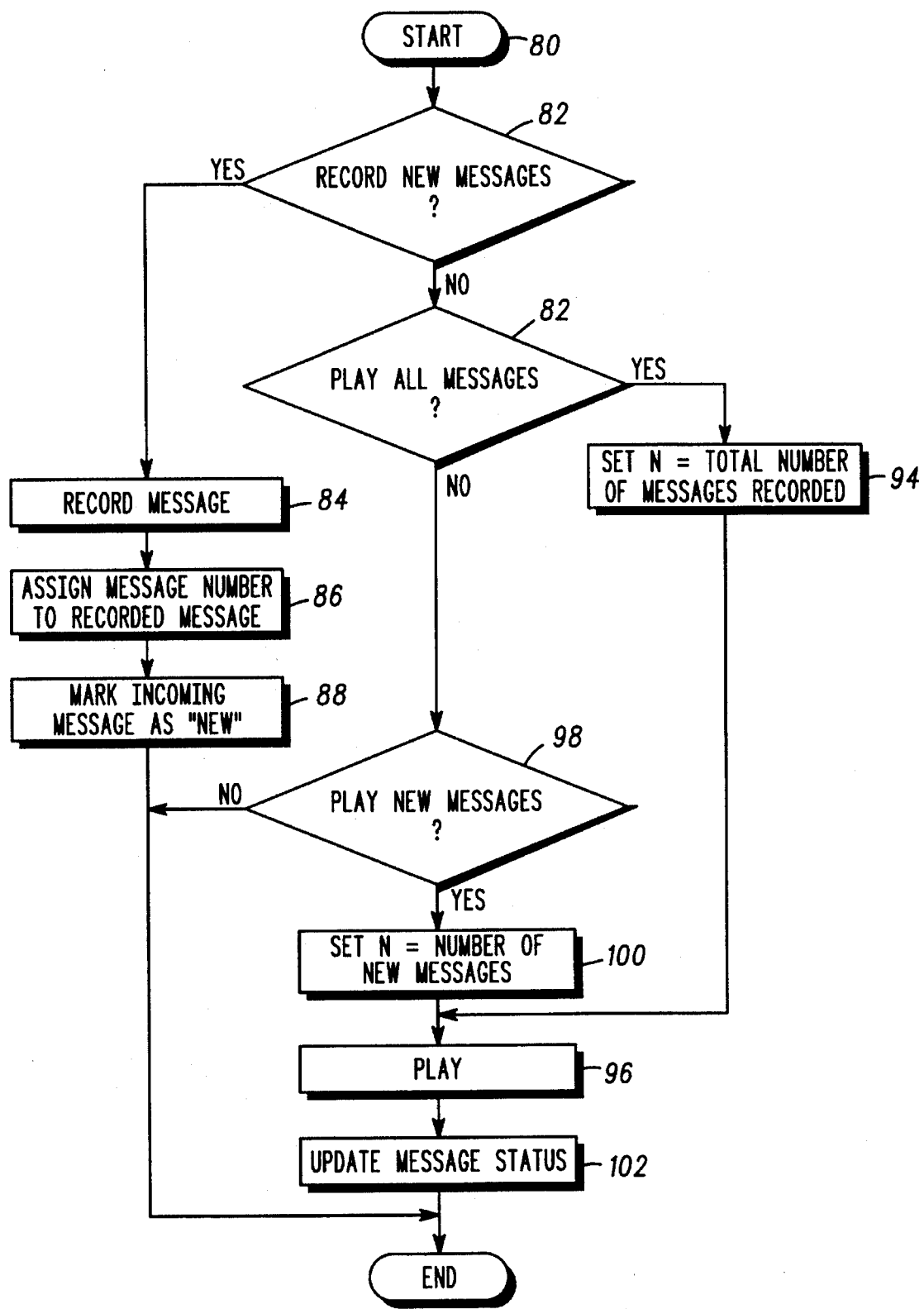
FIG. 3 is a flow chart generally showing the method for designating recorded messages according to the present invention.

Turning to FIG. 3, a flow chart shows the method of designating recorded messages according to the present invention. In particular, an answering machine incorporating the method is powered at a step 80. If an incoming message or "memo" is received at a step 82, the answering machine records the incoming message at a step 84. The answering machine sequentially assigns message numbers to each recorded message at a step 86. Finally, when recording a message, the answering machine will designate each incoming message as "new" at a step 88. However, it will be understood that other categories of messages could be designated within the scope of the present invention. For example, one or more "mailboxes" may be accessed by a caller for recording messages.

If the answering machine is not recording new messages at step 82, a user has an option of replaying all recorded messages which are stored by the answering machine, or only those messages which are designated as "new". In particular, a user can decide whether to replay all messages at a step 92 by selecting replay key 64 on keyboard 20 of the answering machine. At a step 94, a variable N is set equal to the total number of messages recorded. The significance of the variable number N will be described in detail in reference to FIG. 4. All messages are then played back at step 96. The preferred method of playing back messages according to the present invention will be described in detail in reference to FIG. 4.

If the user does not desire to play all messages at step 92 and desires to only replay "new" messages, the user can select a separate replay key 66 at a step 98. The answering machine will set the variable number N equal to the number of new messages at a step 100. The answering machine will then play new messages at step 96 according to the flow chart of FIG. 4. As will be described in detail in reference to FIG. 4, "new" messages may also include messages which had been recorded prior to an earlier playback session, but replayed for less than a designated period of time and would still be considered "new". Generally, messages replayed for greater than a predetermined period of time will be considered "read". After the playback session at step 96, the message status is updated at a step 102, which is described in detail in FIG. 6.

Figure 4:
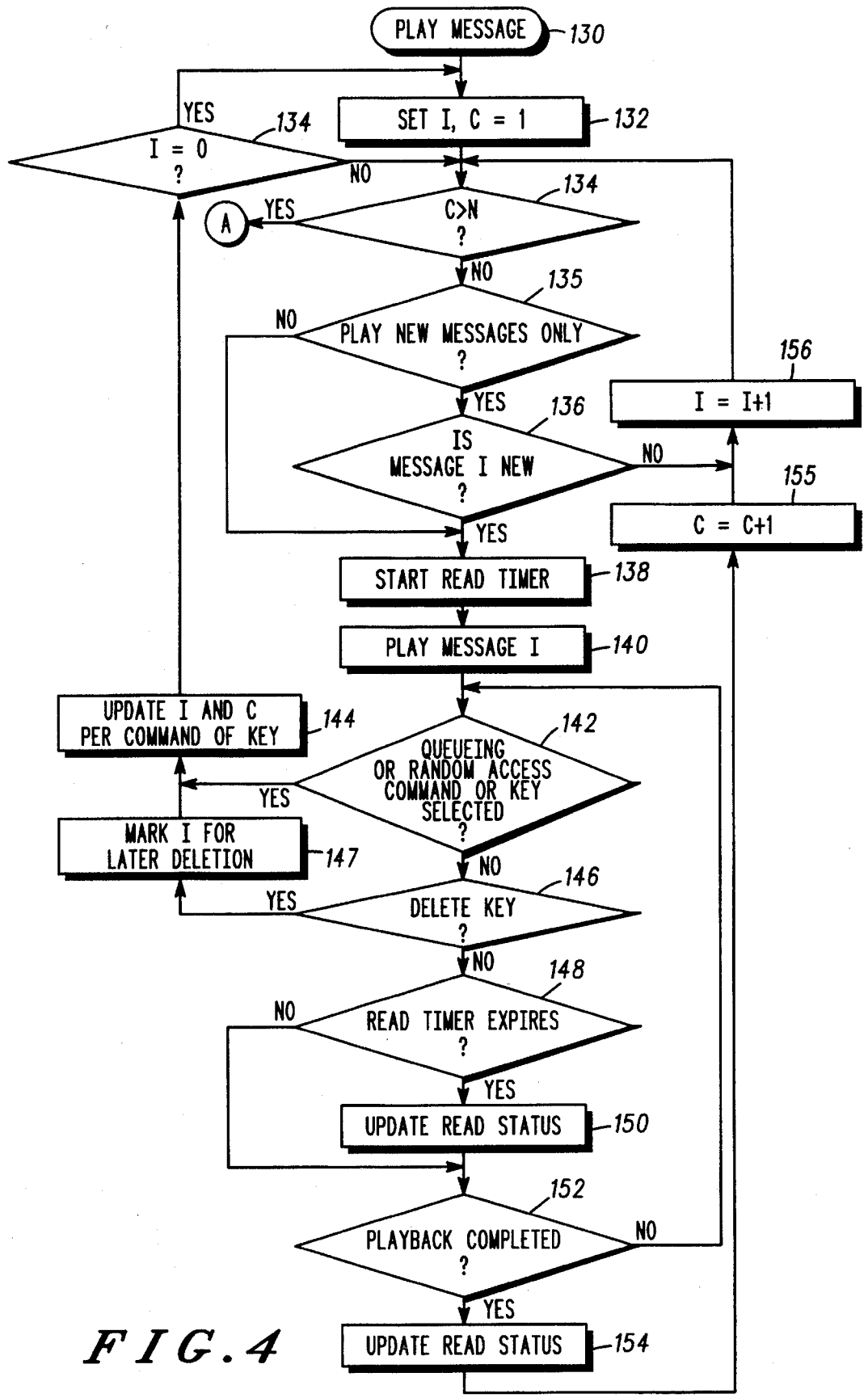
FIG. 4 is a flow chart showing the steps for providing a designation for recorded messages during a playback session according to the method of the present invention.

Turning now to FIG. 4, the preferred steps for replaying recorded messages (shown generally at step 96 of FIG. 3) are described. At a step 130, the user has selected a key on the digital answering machine to replay recorded messages. The machine will then queue to the first message by setting message I=1 and a counter C=1 at a step 132. I generally represents a pointer for identifying a particular message and is incremented whenever the message is played or a queuing function is selected. C generally represents a count of the number of messages which are played. The answering machine will then determine if all the messages have been played back at a step 134 by determining whether the count C is greater than the total number of messages to be played. That is, if the user had decided to play all messages at step 92 of FIG. 3, the variable number N would equal to the total number of messages recorded. Therefore, the answering machine will determine if the count C is greater than the total number of messages recorded. However, if the user had decided to play only new messages, N will be set equal to the number of new messages and the count will be compared to the number of new messages. If count C is not greater than the total number of messages, the answering machine will determine whether only new messages are being played at a step 135. If only new messages are being played, the answering machine will determine whether message I is a "new" message at a step 136. If message I is not a new message, I is incremented by 1. If message I is new (or all messages are being replayed at step 135), a read timer will be started at step 138.

After setting the timer, the answering machine will play message I at a step 140. At any time during the playing of message I, the user has the option to queue to another message by selecting a "forward" or "rewind" key, or access a specific message by selecting a digit on the keyboard of the answering machine. Preferably, a user need only select as many digits as are required to identify the recorded message. If less that nine messages are recorded, only a single number is required and the answering machine will immediately access the selected message. If more than nine messages are recorded in a particular group, the machine will wait a predetermined period of time before accessing a message designated with a single digit to determine whether a second digit is selected. However, the answering machine will immediately access the message if a second could not be selected. For example, if 23 messages are recorded and the user selects a 5 as the first digit, the answering machine will immediately select message 5 because no 5X message exists.

If the user manually selects another message at a step 142, the answering machine will update message I and counter C (depending on the queue or command selected) at step 144. In particular, C is updated as if each of the previous messages for that group had been reviewed. Preferably, an answering machine incorporating the present invention will include a display to display the message being played back. The answering machine will then determine whether message I=0 at a step 145. If message I=0, message I will be set equal to 1 at a step 132 to initialize the replay process. However, if message I is some message other than message 0, the machine will then determine at step 134 whether count C is greater than the number of messages N.

Assuming that no queuing or other key is selected at step 142 during the playing of message I, the answering machine will determine whether the delete key has been selected at step 146. If the delete key has been selected, message I will be marked for later deletion at a step 147, and I and C will be updated at step 144. If no queuing or delete key has been selected, the answering machine will then determine at a step 148 whether the read timer (established at step 138) has expired. If the read timer has expired, the answering machine will determine whether message I will be marked as "read" at a step 150 (as detailed in FIG. 5). If the read timer has not expired at a step 148, or the message has been designated as "read" at a step 150, the answering machine will determine whether the playback of message I is completed at a step 152. If the message playback is not completed, the answering machine will return to step 142 to determine whether any additional message has been accessed by queuing or a random access function. If the playback is completed at step 152, the message is designated as "read" at step 154 (if not already designated as "read" at step 150). The steps of updating the "read" status of blocks 150 and 154 will be described in detail in reference to FIG. 5 and FIG. 6. After updating the read status at step 154, the count is incremented at a step 155 and the message number is incremented at a step 156 to play the next message in the sequence.

Figure 5:
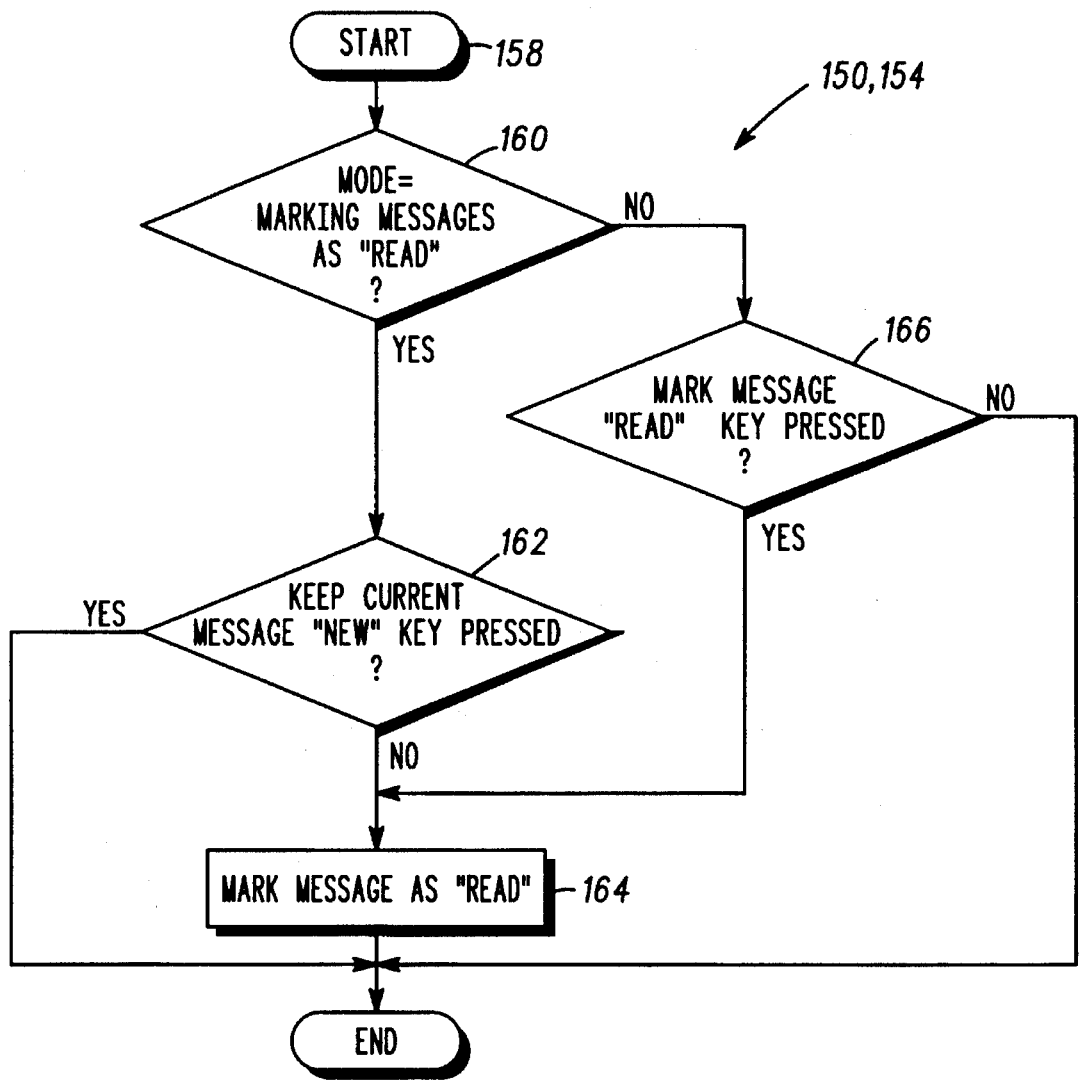
FIG. 5 is a flow chart showing the steps of manually designating messages.

Turning now to FIG. 5, an optional method for manually marking messages as "read" or "new" is disclosed. The steps of the method start at step 158 (when block 150 or 154 is reached in FIG. 5.) Messages can be marked as read, depending upon a particular mode of the answering machine, or the location from which a user accesses the answering machine. One aspect of the invention allows for manually overriding the marking designation as desired. In one mode, the answering machine could mark messages as "read" when certain requirements are met. For example, a message could be marked as "read" if the entire message has been replayed, or a certain portion of the message has been played. In a step 160, if the mode provides for marking messages as "read", the user has the option at a step 162 of keeping the message marked as "new" by selecting a designated key on the keypad. For example, if a user is accessing his messages from a remote location, the user could opt to maintain the marking as "new" after listening to all or a portion of the message when the message would otherwise be marked as "read". If the designation is not overridden at step 162, the message will be marked as "read" at 164. Alternatively, if the answering machine is in a mode where messages are not marked as "read" after being replayed (i.e. all messages remain marked as "new" when accessed for example from a remote location), the user may override the designation as "new" and manually mark the message as "read" at step 166. If the user opts to mark the message as "read" by selecting a designated key, the message will be marked as "read" at step 164.

Figure 6:
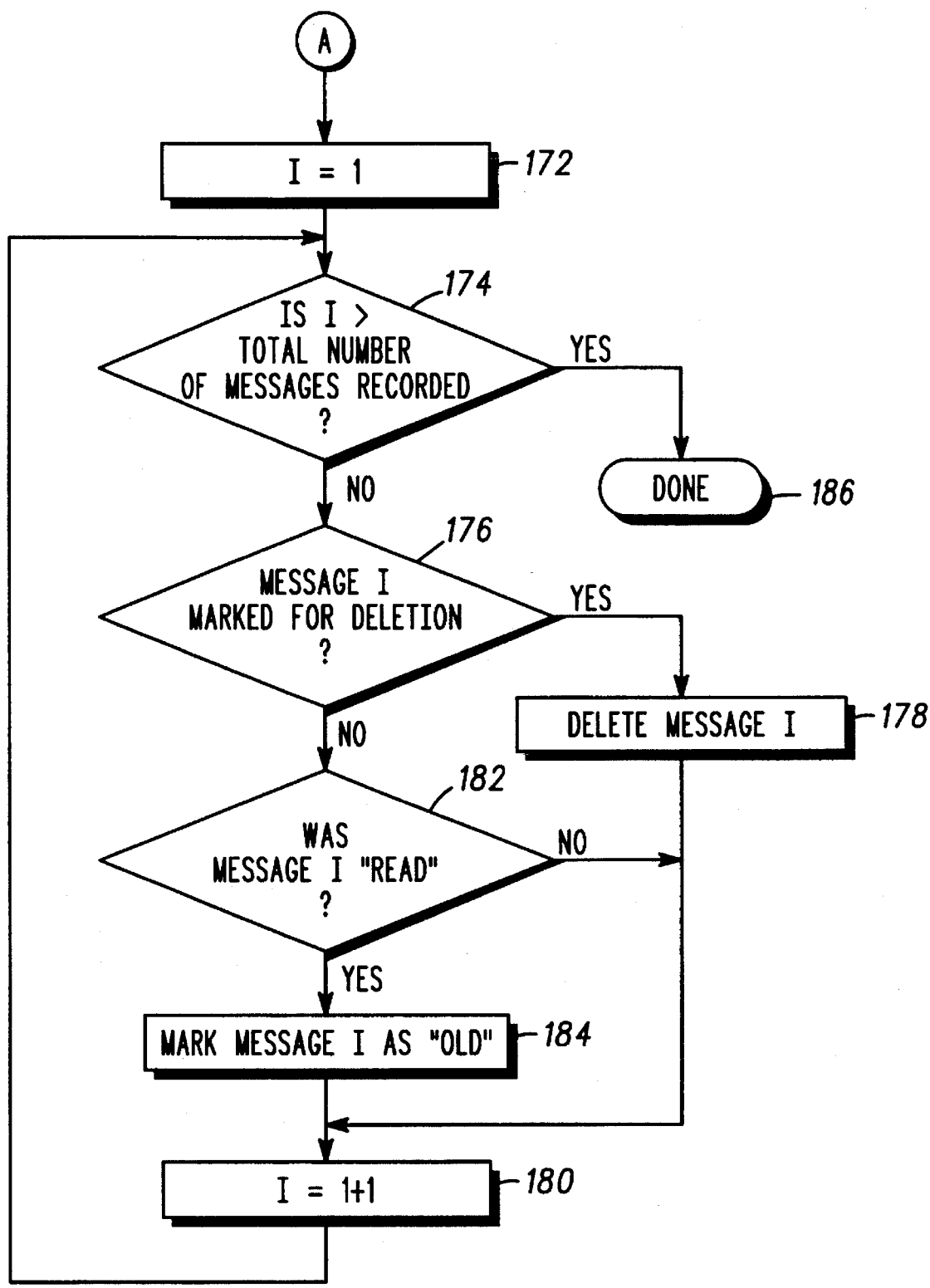
FIG. 6 is a flow chart showing the steps of updating the message designations for recorded messages after a playback session according to the present invention.

Turning now to FIG. 6, the operation of designating messages as "old" (shown generally at a step 102 in FIG. 3) after all messages have been reviewed or the replaying of messages is terminated by the user is described. In order to designate the "read" messages as "old", the message I is set equal to 1 at a step 172. The answering machine then determines whether message I is greater than the total number of messages recorded at a step 174. If the message is not greater than the number of messages, the answering machine determines whether message I was marked for deletion at a step 176. If message I was marked for deletion, message I will be deleted at a step 178, and the index 1 is incremented at a step 180. If the message is not marked for deletion, the answering machine then determines at a step 182 whether message I was designated as "read" during the playback session at steps 150 and 154 of FIG. 4 (and not manually over-ridden according to the steps of FIG. 5). If message I was designated as "read", the message is designated as "old" at a step 184. If message I was not designated as "read" at step 182 or designated as "old" at step 184, the answering machine increments message I at a step 180 and returns to step 174 to determine whether message I is greater than the total number of messages. If message I is greater than the number of messages, the operation of designating certain messages as "old" is completed at step 186. Preferably, messages which are "read" are designated as "old" only after the playback session is ended to maintain the assigned message numbers throughout the playback session. Accordingly, after the playback session, only certain messages will remain designated as "new".

In summary, during the playback of the messages according the method of the present invention, individual messages can be designated as "read" if (i) the message has been played for a predetermined amount of time or (ii) the replay of the message is completed. Because of the queuing capability of the digital answering machine, stored messages can be replayed in any order. Further, a portion of a message can be conveniently replayed to determine whether the message should be replayed in full. As a result, new messages (i.e., messages which have not been designated as "read" and later designated as "old") can be located anywhere in the sequence, and are not restricted to messages recorded at the end of a sequence of messages. Such a function of the present invention allows a user to preview messages to selectively listen to messages, while maintaining a designation as "new" for any message in the sequence which has not been replayed in full or at least for a predetermined period of time.

While the present invention discloses a method for designating messages as "new" or "old", other designations for messages could be established. For example, a designation could be established for "new" messages which have never been previewed. Further, the replay options for messages could include other groups, such as only "old" messages for purposes of deleting messages. Such other message designations are contemplated within the spirit and scope of the present invention.

We claim:

1. A method for providing a message designation to messages recorded in an answering machine comprising the steps of:

assigning a message designation to each recorded message indicating that a message is new; and updating the message designation for selected recorded messages upon replay of the recorded messages, wherein the message designation is updated for recorded messages which have been replayed for a predetermined period of time during a playback session.

2. The method for providing a message designation of claim 1 wherein the step of assigning a message designation comprises sequentially assigning a number to each recorded message respectively.

3. The method for providing a message designation of claim 2 wherein said step of updating the message designation is performed after said playback session for messages which have been replayed for said predetermined period of time.

4. The method for providing a message designation of claim 3 further comprising a step of sequentially assigning a second number for each remaining message respectively having a new message designation.

5. The method for providing a message designation of claim 1 wherein said step of updating the message designation comprises updating recorded messages which have been replayed for a predetermined period of time which is selected from the group consisting of:

the duration of the message; and a fixed period of time.

6. A method for providing a message designation to a message recorded in an answering machine comprising the steps of:

assigning a new message designation to each recorded message;

sequentially assigning a first number to each recorded message;

updating the message designation for selected recorded messages after a playback session, wherein the message designation is updated for recorded messages which have been replayed for a predetermined amount of time during said playback session; and sequentially assigning a second number for each remaining new message respectively.

7. The method for providing a message designation according to claim 6 wherein said step of updating the message designation is performed manually by a user.

8. The method for providing a message designation according to claim 6 further including a step of manually updating the message designation.

9. A method for recording and replaying messages in an answering machine comprising the steps of:

(a) recording incoming messages received by the answering machine;

(b) initially assigning a message designation to each recorded message indicating that the recorded message is new;

(c) replaying selected recorded incoming messages; and (d) updating the message designation for said selected messages which are replayed for a predetermined period of time during a playback session.

10. The method for recording and replaying messages of claim 9 wherein said step (a) of recording incoming messages further comprises a step of (a1) of sequentially assigning a first number to each recorded message respectively.

11. The method for recording and replaying messages of claim 10 wherein said step (b) of initially assigning a message designation further comprises a step (b1) of sequentially assigning a second number to each new recorded message respectively.

12. The method for recording and replaying messages according to claim 10 wherein said step (d) of updating the message designation further comprises a step (d1) of updating a second sequential number respectively assigned to each new message.

13. The method for recording and replaying messages of claim 9 wherein said step of updating the message designation further comprises a step (c1) of updating recorded messages which have been replayed for a predetermined period of time which is selected from the group consisting of:

the duration of the message; and a fixed period of time.

14. The method for recording and replaying messages according to claim 9 wherein said step (c) of replaying selected recorded messages further comprises a step (c2) of replaying a group of recorded messages, said group being defined by said message designation assigned to each recorded message.

15. The method for recording and replaying messages according to claim 9 wherein said step (c) of replaying recorded messages further comprises a step (c3) of replaying individual messages based on an assigned message number selected by the user.

16. The method for recording and replaying messages according to claim 9 wherein said step (c) of replaying recorded messages further comprises a step (c4) of cursoring through recorded messages to reach a predetermined recorded message.

17. The method for recording and replaying messages according to claim 9 wherein said step (d) of updating the message designation is performed by a user.

18. The method for recording and replaying messages according to claim 9 wherein said step (c) of replaying recorded messages further comprises a step (c5) wherein a predetermined message is randomly selected.

19. The method for recording and replaying messages according to claim 18 wherein step (c5) provides immediate access to said predetermined message with a minimum of digits of said message designation required to access said predetermined message.

* * * * *